US012618419B2

(12) United States Patent
Helbig et al.

(10) Patent No.: US 12,618,419 B2
(45) Date of Patent: May 5, 2026

(54) HYDRAULIC DRIVE SYSTEM

(71) Applicant: HMS—Hybrid Motion Solutions GmbH, Rutesheim (DE)

(72) Inventors: Achim Helbig, Stuttgart (DE); Mattias Roegner, Erlingheim (DE); Dirk Becher, Nufringen (DE); Tino Kentschke, Weil der Stadt (DE)

(73) Assignee: HMS-HYBRID MOTION SOLUTIONS GmbH, Rutesheim (DE)

( * ) Notice: Subject to any disclaimer, the term of this patent is extended or adjusted under 35 U.S.C. 154(b) by 151 days.

(21) Appl. No.: 18/563,409

(22) PCT Filed: Apr. 28, 2022

(86) PCT No.: PCT/EP2022/061355
§ 371 (c)(1),
(2) Date: May 27, 2024

(87) PCT Pub. No.: WO2022/248153
PCT Pub. Date: Dec. 1, 2022

(65) Prior Publication Data

US 2025/0264117 A1 Aug. 21, 2025

(30) Foreign Application Priority Data

May 27, 2021 (DE) ......................... 102021113665.2

(51) Int. Cl.
*F15B 7/00* (2006.01)
*F15B 1/26* (2006.01)
*F15B 19/00* (2006.01)

(52) U.S. Cl.
CPC .............. *F15B 7/001* (2013.01); *F15B 1/265* (2013.01); *F15B 7/006* (2013.01); *F15B 19/002* (2013.01);
(Continued)

(58) Field of Classification Search
CPC ............. F15B 2211/20515; F15B 2211/20576
See application file for complete search history.

(56) References Cited

U.S. PATENT DOCUMENTS 5,179,836 A * 1/1993 Dantlgraber ............ F15B 11/08 60/486
2015/0107236 A1* 4/2015 Udagawa .............. E02F 9/2217 60/430
(Continued)

FOREIGN PATENT DOCUMENTS

DE 102011056894 A1 * 11/2012 .............. F15B 21/14
DE 102013-212937 A1 7/2014
(Continued)

*Primary Examiner* — Thomas E Lazo
(74) *Attorney, Agent, or Firm* — Douglas Denninger

(57) ABSTRACT

The invention relates to a hydraulic drive system, to a method for adjusting a delivery volume in a hydraulic drive system, and to the use of the hydraulic drive system for controlling a hydraulic cylinder. The hydraulic drive system according to the invention is a hydraulic drive system with a first hydraulic machine and a second hydraulic machine which are connected mechanically to one another. The first hydraulic machine and the second hydraulic machine are operated jointly by a variable-speed drive. The first hydraulic machine and the second hydraulic machine are connected hydraulically to at least one first hydraulic cylinder, comprising a first hydraulic cylinder surface and a second hydraulic cylinder surface. The first hydraulic machine and/or the second hydraulic machine have/has an adjustable delivery volume.

12 Claims, 2 Drawing Sheets

(52) U.S. Cl.
CPC ............... *F15B 2211/20515* (2013.01); *F15B 2211/20538* (2013.01); *F15B 2211/20576* (2013.01); *F15B 2211/2658* (2013.01)

(56) References Cited

U.S. PATENT DOCUMENTS

| | | | | |
|---|---|---|---|---|
| 2017/0138335 | A1 | 5/2017 | Becher et al. | |
| 2017/0198731 | A1* | 7/2017 | Sugano .................... | F15B 1/033 |
| 2020/0096015 | A1* | 3/2020 | Zeller ...................... | F15B 11/17 |
| 2022/0010792 | A1 | 1/2022 | Kondo et al. | |

FOREIGN PATENT DOCUMENTS

| | | | | |
|---|---|---|---|---|
| DE | 10213212937 | A1 | 7/2014 | |
| DE | 102013008047 | A1 * | 11/2014 | ........... F03D 7/0224 |
| DE | 102021113665.2 | | 2/2026 | |
| EP | 2772379 | B1 | 11/2015 | |
| JP | 2002-039110 | A | 2/2002 | |
| WO | WO-2014-183941 | A1 | 11/2014 | |

* cited by examiner

HYDRAULIC DRIVE SYSTEM

The invention relates to a hydraulic drive system, to a method for adjusting a delivery volume in a hydraulic drive system, and to the use of the hydraulic drive system for controlling a hydraulic cylinder.

Hydraulic drive systems are used in many types of industrial applications. Generic hydraulic drive systems can be found in forming technology systems such as presses, rolling mills and generally in the construction of hydraulic units.

A drive system with two mechanically coupled hydraulic machines is known from publication DE 10 2010 020 690 A1. These hydraulic machines are driven by a primary drive. In the hydraulic drive system shown, two hydraulic machines are driven conjointly at variable speeds by one motor via a drive shaft. The motor is configured as an electric motor. Said electric motor can be operated at a variable speed and with a variable direction of rotation. The two hydraulic machines of said hydraulic drive system are each fluidically connected via a hydraulic port to a respective side of the hydraulic cylinder and thus to the corresponding hydraulic cylinder surface, as well as to a reservoir. The two hydraulic machines can be arranged on the drive shaft in such a way that one of the two hydraulic machines functions as a pump and the other hydraulic machine functions as a motor. For example, the first hydraulic machine can provide the functionality of a pump for a clockwise direction of rotation, and the second hydraulic machine functions as a motor. By changing the direction of rotation of the hydraulic machine so that it is driven counterclockwise, the first hydraulic machine assumes the functionality of a motor, and the second hydraulic machine functions as a pump.

The problem with the solution described in DE 10 2010 020 690 A1 is that the conveyed or displaced volume of the two mechanically coupled hydraulic machines must be precisely adapted to the cylinder surface ratio. This leads to a very limited possibility of use, since neither the hydraulic machines having a defined conveyed or displaced volume nor the cylinder rod or piston rod diameter can be varied in an arbitrary manner. The cylinder surface ratio is usually determined by the drive task and its general parameters. Hydraulic machines are available with a fixed, graduated conveyed or displaced volume, respectively. If the delivery volume of the two hydraulic machines is not precisely adapted to the cylinder surface ratio, there will be a total pressure increase over the cylinder stroke. This increase in pressure leads to a lower useful power of the cylinder, since the cylinder chamber pressure level must not be arbitrarily high. Furthermore, the fixed connection between in each case one hydraulic machine and a cylinder chamber means that, when using a differential cylinder with an exemplary surface ratio of 2:1, one hydraulic machine has a delivery volume that is twice as large as the other and must be of a correspondingly large configuration. This has an impact on the space required and the costs of the drive system shown.

Furthermore, a hydraulic drive system with a hydraulic machine in a radial piston design with control pins is known from publication EP 292 1700 A1. The hydraulic machine is driven by a variable-speed motor. The hydraulic machine has at least three hydraulic ports, whereby the delivery volume of the hydraulic ports is determined by the control pin. The delivery volume is the volume of hydraulic fluid that flows through the cross section of a component per revolution of the motor. A solution to the differential cylinder adjustment is solved in this publication via the mentioned control pin of the hydraulic machine. The solution presented in the publication EP 292 1700 A1 also results in the problem that the control pin must be precisely adapted to the cylinder surface ratio. This consequently means that the total pressure varies depending on the cylinder stroke.

Furthermore, variable-displacement pumps are known in the prior art. In hydraulic drive systems, a hydraulic cylinder is operated by at least two hydraulic machines, whereby at least one hydraulic machine is a variable-displacement pump. In a variable-displacement pump, the adjustment of the stroke ring and thus the vane of the variable-displacement pump is moved via a hydraulic cylinder. This cylinder must be pressurized and impinged with hydraulic fluid, resulting in the need for a proportional valve to control the cylinder. This results in a high level of structural and design-related complexity. Furthermore, a control system is necessary for this cylinder, which leads to an increased energetic problem since a constant pressure system which supplies this proportional valve is required. Therefore, a variable-displacement pump is inefficient and correspondingly complicated in terms of its structure and supply and, due to the other components, is maintenance-prone and less reliable and is expensive to procure, maintain and repair.

When operating a hydraulic cylinder, the total pressure in the hydraulic system should remain constant in order to have maximum useful power available. If the hydraulic cylinder is operated by a hydraulic drive system that only has one motor, the volumetric flow applied to the two hydraulic cylinder sides must be adjusted precisely to the ratio of the two hydraulic cylinder sides. For example, if a differential cylinder with a surface ratio of 2:1 is operated by a hydraulic drive system, the ratio of the delivery volume at the hydraulic ports on the two hydraulic cylinder sides must also be 2:1.

The problem that arises from this for the hydraulic drive systems known in the prior art is that the delivery volumes of the hydraulic ports of the hydraulic machine(s), which are connected to the hydraulic cylinder sides, must be adapted to the hydraulic cylinder. In the prior art, this is done by selecting the two hydraulic machines or the control pin. The hydraulic machines here have a non-variable delivery volume. The delivery volume made available by the control pin is likewise not variable. If the hydraulic drive system is now connected to a hydraulic cylinder that does not have the volume ratio for which the hydraulic drive system is designed, at least one of the hydraulic machines or the control pin must be replaced. This is associated with considerable labor and costs, since at least one of the two hydraulic machines must be replaced and a third hydraulic machine, which has a different delivery volume than the hydraulic machine to be replaced, must be installed instead. Alternatively, the control pin must be removed and replaced with a control pin that has a different delivery volume than the previously used control pin. This entire process is not only intensive in terms of time and costs, but also prone to errors, which can lead to downtime and rework later on.

A technical object on which the invention is based can therefore be to at least partially eliminate the disadvantages identified in the prior art and to provide a hydraulic drive system in which the delivery volume of the hydraulic machine(s) can be adapted to a hydraulic cylinder.

According to the invention, this object is achieved according to a first aspect by a hydraulic drive system with the features of independent patent claim 1. Advantageous further refinements of the hydraulic drive system are derived from the dependent claims pertaining to the hydraulic drive system.

According to the invention, the hydraulic drive system has a first hydraulic machine and a second hydraulic machine. The first hydraulic machine and the second hydraulic machine are mechanically connected to one another. For example, the first hydraulic machine and the second hydraulic machine can be mechanically connected to one another via a drive shaft. The first hydraulic machine and the second hydraulic machine are a hydraulic machine which is adjustable in terms of its displacement volume.

Furthermore, the first hydraulic machine and the second hydraulic machine are operated conjointly by a variable-speed drive. The variable-speed drive can be configured as a variable-speed or variable-direction electric motor. Variable-speed drives consist substantially of an electric motor, a hydraulic pump and a frequency converter, the software of the latter continuously adjusting the motor speed as a function of the load for the optimal operating point. For example, an electrically driven fixed displacement pump delivers a demand-oriented volumetric flow in order to regulate pressure, speed, power, position or force depending on the task.

It is also provided that the first hydraulic machine and the second hydraulic machine are hydraulically connected to at least a first hydraulic cylinder. The hydraulic cylinder preferably has a first hydraulic cylinder surface and a second hydraulic cylinder surface. The hydraulic cylinder is preferably configured as a differential cylinder. Alternatively, the hydraulic cylinder can be configured as a synchronous cylinder. The first hydraulic cylinder side and the second hydraulic cylinder side of the hydraulic cylinder can each be configured as the ring side as well as the piston side of the hydraulic cylinder.

According to the present invention, the first hydraulic machine and/or the second hydraulic machine have/has an adjustable delivery volume.

For the purposes of the present invention, an adjustment is understood to be a manual mechanical stroke setting. The delivery volume per pump revolution can be determined using the manual mechanical stroke setting. In particular with piston pumps and vane pumps, the stroke of the pistons or vanes can be adjusted manually using this setting. This stroke setting leads to a change in the delivery volume per revolution. It is furthermore provided that the delivery volume can be adjusted mechanically.

The stroke setting selected in this way can be locked using a mechanical fixing device. If the stroke setting is performed using an adjusting spindle, the former can be locked using a lock nut.

The delivery volume at the hydraulic port of the first hydraulic cylinder side and the delivery volume at the hydraulic port of the second hydraulic cylinder side can thus be adapted to the volume ratio of the first hydraulic cylinder side and the second hydraulic cylinder side.

Advantageously, the delivery volume can be ideally adjusted to the cylinder surface ratio. A total pressure increase over the cylinder stroke and thus a reduction in useful force can be avoided. Furthermore, it is advantageous that the delivery volume only has to be adjusted mechanically once so as to correspond to a first adjustment parameter. There is no need for any permanent adjustment to be performed.

In particular, the present invention provides a reliable and energy-efficient hydraulic drive system by preventing the increase in system pressure, particularly in differential cylinders.

In one advantageous embodiment, a ratio of the delivery volumes of the first hydraulic machine and the second hydraulic machine is mechanically adjustable to a surface ratio of the first hydraulic cylinder surface and the second hydraulic cylinder surface. Here, the ratio of the delivery volume of the first hydraulic machine to the delivery volume of the second hydraulic machine should correspond to the surface ratio of the two hydraulic cylinder sides. The volumetric flow Q in the hydraulic drive system is provided via the variable speed of the first and second hydraulic machines, and the delivery volume is adjusted via the adjustment parameter.

In a further advantageous embodiment, a delivery volume (volume $V=dQ/dt$) of the hydraulic drive system is controlled by a determined adjustment parameter. In the context of the invention, the delivery volume corresponds to the volume of hydraulic fluid that is moved in the hydraulic drive system per unit of time. The adjustment parameter can be determined, for example, using a method according to the further aspect of the present invention. In particular, the determined adjustment parameter (specific) is derived with reference to the connected cylinder. This is determined and set for the cylinder used. The determined adjustment parameter results from the surface ratio of the cylindrical surfaces of the cylinder.

In a further advantageous embodiment, the first hydraulic cylinder surface and the second hydraulic cylinder surface are different. Typically, differential cylinders are used that are configured with only one piston rod. This can, for example, lead to a shortened overall construction length, to a greater achievable force on the piston side, and to a simplified seal construction on the hydraulic cylinder. It is known that approx. 80% of the hydraulic cylinders used in practice are configured as differential cylinders.

In a further advantageous embodiment, the first hydraulic machine and/or the second hydraulic machine are/is selected from a group of pumps comprising at least a positive displacement pump. Here, the hydraulic machine can be configured, for example, as an axial piston pump, radial piston pump or vane pump, gear pump, spindle pump and the like. Furthermore, it is provided that the manually adjustable pump is configured as a positive displacement pump, in particular an axial piston pump, radial piston pump, or vane pump.

The axial piston pump is used in hydraulic engineering to convert mechanical energy into hydraulic energy. The volumetric flow can be adjusted using the axial piston pump.

In contrast to the axial piston pump, the working pistons of the radial piston pump are arranged radially and perpendicular to the drive shaft. The radial piston pump is characterized by its good efficiency.

The vane pump is a positive displacement pump having a hollow cylinder in which another cylinder rotates. The delivery volume is able to be set and/or adjusted mechanically.

In a further embodiment, the second hydraulic machine is connected to the second hydraulic cylinder surface of the hydraulic cylinder. Preferably, the second hydraulic machine by way of a first port is connected to the second hydraulic cylinder surface of the hydraulic cylinder. Advantageously, by means of this design embodiment, the volume of the first hydraulic machine of the hydraulic drive system can be designed to be smaller in terms of construction. In this regard, the construction of the first hydraulic machine is correspondingly smaller and therefore more cost-effective and less maintenance-intensive and/or prone to errors and defects.

In a further advantageous embodiment, the first hydraulic machine is connected to the first hydraulic cylinder surface of the hydraulic cylinder. Preferably, the first hydraulic machine by way of a first port is connected to the first hydraulic cylinder surface of the hydraulic cylinder. In this embodiment, the volume of the first hydraulic machine is designed to be smaller. Furthermore, the first hydraulic machine has two ports, one of which can in each case be supplied with the entire working pressure.

In a further advantageous embodiment, the first hydraulic machine is connected to a reservoir of the hydraulic drive system. Preferably, the first hydraulic machine by way of a second port is connected to a reservoir of the hydraulic drive system.

In a further advantageous embodiment, the second hydraulic machine is hydraulically connected to the first hydraulic cylinder surface. Preferably, the second hydraulic machine by way of a second port is hydraulically connected to the first hydraulic cylinder surface.

The reservoir is configured to supply additional hydraulic fluid for the hydraulic drive system as required. A feeder valve can be provided between the first hydraulic machine and the reservoir. Since the second hydraulic machine is intended to be connected to the first hydraulic cylinder side and the second hydraulic cylinder side, the second hydraulic machine conveys the hydraulic fluid between the two hydraulic cylinder sides, depending on the direction of rotation, from the first hydraulic cylinder side to the second hydraulic cylinder side or from the second hydraulic cylinder side to the first hydraulic cylinder side.

In this embodiment, the first hydraulic machine can be provided to only balance the volume ratio of the first hydraulic cylinder side and the second hydraulic cylinder side. The required delivery volume of the first hydraulic machine is therefore lower compared to an embodiment in which the second hydraulic machine is not connected to the first hydraulic cylinder side. The first hydraulic machine can therefore be smaller, which reduces the space for installation and construction and thus the technical complexity and the costs incurred.

In a further advantageous embodiment, the second hydraulic machine is hydraulically connected to a reservoir of the hydraulic drive system. Preferably, the second hydraulic machine by way of a second port is hydraulically connected to a reservoir of the hydraulic drive system.

In this advantageous design embodiment, the second port of the second hydraulic machine is preferably always connected to the reservoir. A hydraulic machine comprising one pressure port can thus be provided. As a result, the internal construction of the hydraulic machine can be configured in a simplified manner. The first hydraulic machine, in contrast to the simplified second hydraulic machine, must provide the entire volumetric flow requirement of the first cylinder chamber and must therefore be designed to be significantly larger.

The reservoir can be configured as a tank without positive pressure. In a further advantageous design embodiment, the reservoir can be under positive pressure. In particular, the reservoir 6 can be configured as a pre-stressed reservoir. Preferably, the positive pressure can be in a range of 2-25 bar, particularly preferably in a range of 2-10 bar. In this regard, increased suction of the first hydraulic machine and of the second hydraulic machine is made possible. Furthermore, this construction advantageously results in the hydraulic medium (e.g. hydraulic fluid) being able to be separated from the atmosphere, and aging of the hydraulic medium can be counteracted in this way.

In a further preferred embodiment, the pre-stressed reservoir 6 is pressurized with a pressure in a fluctuation range preferably of 22 bar, more preferably of 14 bar. The hydraulic pumps can advantageously be operated in this fluctuation range without their sealing ability and/or quality being reduced. Furthermore, the hydraulic pumps are operated in a range in which the load limits of the pump housing are adhered to in order to prevent damage.

In a further advantageous embodiment, the first hydraulic machine and the second hydraulic machine have at least one high-pressure port.

In a further advantageous embodiment, the first hydraulic machine or the second hydraulic machine has at least one high-pressure port.

For example, a hydraulic port of the first hydraulic machine and a hydraulic port of the second hydraulic machine, which is connected either to the first hydraulic cylinder side or the second hydraulic cylinder side, can be configured as a high-pressure port. In a further advantageous embodiment of the hydraulic drive system, the first hydraulic machine and/or the second hydraulic machine have/has a low-pressure port. A hydraulic port of the first hydraulic machine and a hydraulic port of the second hydraulic machine, which is connected to the reservoir, can be configured as a low-pressure port.

A high-pressure line can be connected via the high-pressure port. For example, a high-pressure line for connecting to the hydraulic cylinder can be connected to the high-pressure port. The low-pressure port can be permanently connected to a tank line and provide a hydraulic connection to the reservoir.

In a further advantageous embodiment of the hydraulic drive system, the first hydraulic machine and/or the second hydraulic machine have/has a high-pressure and low-pressure accumulator. The first hydraulic machine is connected to the second hydraulic cylinder side of the hydraulic cylinder, and the second hydraulic machine is connected to the first hydraulic cylinder side of the hydraulic cylinder. In a further advantageous embodiment of the hydraulic drive system, the first hydraulic machine and/or the second hydraulic machine have/has a high-pressure and low-pressure accumulator. The first hydraulic machine is connected to the first hydraulic cylinder side of the hydraulic cylinder, and the second hydraulic machine is connected to the second hydraulic cylinder side of the hydraulic cylinder.

According to a further aspect, the present invention relates to a method for adjusting a delivery volume of a hydraulic drive system having the features of independent patent claim 12. Advantageous refinements of the method are derived from the dependent claims pertaining to the method.

The method for adjusting a delivery volume in a hydraulic drive system having a first hydraulic machine and/or a second hydraulic machine comprises the following steps:

determining a surface ratio between a first hydraulic cylinder surface and a second hydraulic cylinder surface of a hydraulic cylinder of the hydraulic drive system;

determining a target delivery volume of the first hydraulic machine and/or the second hydraulic machine;

determining a first adjustment parameter of the first hydraulic machine and/or the second hydraulic machine; and adjusting the delivery volume of the first hydraulic machine and/or the second hydraulic machine of the hydraulic drive system using the determined first adjustment parameter. In an advantageous embodiment of the method, the latter comprises the further step:

testing the first hydraulic machine and/or the second hydraulic machine on a test bench and/or by way of a test run to determine whether the adjusted delivery volume corresponds to the surface ratio of the hydraulic cylinder.

Advantageously, by testing the hydraulic machine, the adjusted delivery volume can be checked to see whether it meets the requirements of the hydraulic drive system.

In a further advantageous embodiment of the method, the delivery volume is adjusted by adjusting an adjusting element using the determined first adjustment parameter. The adjusting element is preferably fixed via a locking element.

Advantageously, the delivery volume of one of the hydraulic machines can be adjusted and thus changed in an efficient manner via the adjusting element. Furthermore, with the present invention, the delivery volume only needs to be changed/set once via the adjusting element and can be fixed to this setting by using a locking element.

According to a preferred embodiment, the adjusting element is configured at least as a threaded spindle, as a threaded bolt or as a threaded screw. The adjusting element can be configured as a corresponding lock nut.

According to a further aspect, the present invention relates to a hydraulic drive system for controlling a hydraulic cylinder with a constant total pressure in the hydraulic drive system.

The above design embodiments and refinements can be combined with one another in an arbitrary manner, if meaningful. In particular, the features of the method claims can be realized as structural features in the hydraulic drive system. It can moreover be provided that the method is implemented by structural features. Further possible design embodiments, refinements and implementations of the invention also comprise combinations that have not been explicitly mentioned of features of the invention described above or hereunder with reference to the exemplary embodiments. In particular, the person skilled in the art will also add individual aspects as an improvement or addition to the respective basic form of the present invention.

The invention will be explained hereunder by means of various embodiments, whereby it is to be pointed out that these examples also comprise modifications or additions that are immediately apparent to a person skilled in the art. Moreover, these preferred exemplary embodiments do not limit the invention in such manner that modifications and additions are within the scope of the present invention.

In the figures of the drawing, identical, functionally identical and functionally equivalent elements, features and components-unless otherwise stated—are each provided with the same reference signs.

Figure 1:
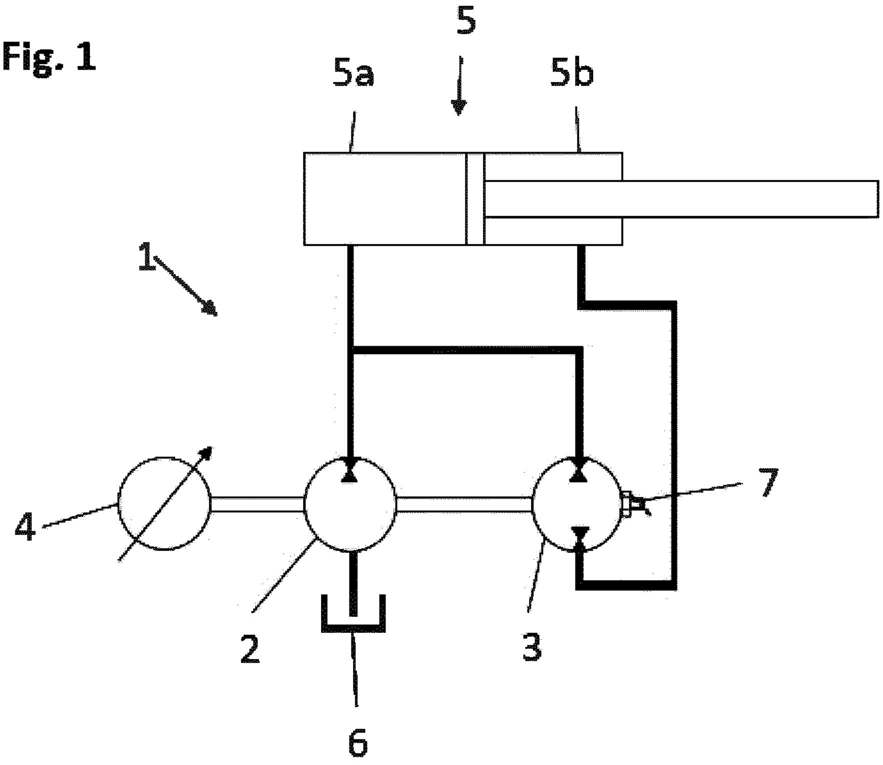
FIG. 1 shows a first embodiment of the hydraulic drive system according to the present invention.

FIG. 1 shows a hydraulic drive system 1. The hydraulic drive system 1 includes a first hydraulic machine 2 and a second hydraulic machine 3. The first hydraulic machine 2 and the second hydraulic machine 3 are driven conjointly via a shaft by a variable-speed drive 4. Preferably, the first hydraulic machine 2 and the second hydraulic machine are mechanically connected to one another. The mechanical connection can be established via a shaft. The first hydraulic machine 2 and the second hydraulic machine 3 are configured as fixed displacement pumps. The first hydraulic machine 2 is hydraulically connected to a reservoir 6. A feeder valve (not illustrated) can be interposed between the first hydraulic machine 2 and the reservoir 6. A reservoir 6 (compensation vessel) is understood to mean a vessel which receives the hydraulic oil or the hydraulic medium of the hydraulic drive system 1. The hydraulic fluid or the hydraulic medium can be a special mineral oil. The reservoir 6 is intended to store the hydraulic fluid, but otherwise keeps the latter unpressurized. The reservoir is understood to be a tank without positive pressure. This allows the reservoir 6 to be filled and emptied without risk. The reservoir 6 is embodied as a closed vessel that is connected to the surrounding air via vent valves. This connection is necessary so that pressure equalization can take place. Otherwise, returning hydraulic fluid, or the hydraulic medium, would generate positive pressure, and escaping hydraulic fluid would create negative pressure. The closed system makes it possible to ensure that no cavitation occurs and thus the quality of the hydraulic medium (e.g. oil) is maintained, or the latter does not age and/or ages less rapidly. This reduces premature replacement and/or maintenance intervals.

In a further preferred embodiment, the reservoir 6 can be configured to be under positive pressure. In particular, the reservoir 6 can be configured as a pre-stressed reservoir.

Preferably, a positive pressure can be provided in a range of 2-25 bar, particularly preferably in a range of 2-10 bar. A reservoir with positive pressure enables increased induction by the first hydraulic machine and the second hydraulic machine. Furthermore, this construction allows the hydraulic medium to be separated from the atmosphere and thus counteracts aging of the hydraulic medium.

In a further preferred embodiment, the pre-stressed reservoir 6 is pressurized with a pressure in a fluctuation range, preferably of 22 bar, more preferably of 14 bar. The hydraulic pumps can advantageously be operated in this fluctuation range without their sealing ability and/or quality being reduced. Furthermore, the hydraulic pumps are operated in a range in which the load limits of the pump housing are adhered to in order to prevent damage.

The first hydraulic machine 2 and the second hydraulic machine 3 are hydraulically connected to a first hydraulic cylinder side 5*a* of a hydraulic cylinder 5. The second hydraulic machine 3 is hydraulically connected to the second hydraulic cylinder side 5*b* of the hydraulic cylinder 5.

If the variable-speed drive 4 drives the first hydraulic machine 2 and the second hydraulic machine 3, then, depending on the direction of rotation of the variable-speed drive 4, the first hydraulic machine 2 conveys hydraulic fluid from the reservoir 6 into the first hydraulic cylinder side Sa of the hydraulic cylinder, and the second hydraulic machine 3 conveys hydraulic fluid from the second hydraulic cylinder side 5*b* of the hydraulic cylinder 5 into the first hydraulic cylinder side Sa of the hydraulic cylinder 5. The piston of the hydraulic cylinder 5 is deployed. If the drive 4 drives the first hydraulic machine 2 and the second hydraulic machine 3 in the other direction, the first hydraulic machine 2 conveys hydraulic fluid from the first hydraulic cylinder side 5*a* of the hydraulic cylinder 5 into the reservoir 6, and the second hydraulic machine 3 delivers hydraulic fluid from the first hydraulic cylinder side 5*a* of the hydraulic cylinder into the second hydraulic cylinder side 5*b* of the hydraulic cylinder 5. The piston of the hydraulic cylinder 5 is retracted.

The delivery volume in the hydraulic drive system 1 can be controlled via the rotating speed of the variable-speed drive 4. In this arrangement, the first hydraulic machine 2 only has to compensate for the volume ratio of the first hydraulic cylinder side 5*a* and of the second hydraulic cylinder side 5*b*. The delivery volume of the first hydraulic machine 2 can therefore be smaller than in other arrangements. The first hydraulic machine 2 can therefore be designed to be smaller in terms of construction mode.

It is provided that the delivery volume of at least one hydraulic machine 2, 3 is adjusted, or mechanically set and fixed, per pump revolution. For this purpose, the fixed delivery volume of the first hydraulic machine 2 and/or the second hydraulic machine 3 is changed. For example, in a radial piston pump (RKP) it can be provided that the delivery volume is adjusted via the eccentricity of the stroke ring. This leads to an adjustment of the stroke of the pistons or vanes and thus to a change in the delivery volume per pump revolution. The eccentricity of the stroke ring can be adjusted and the delivery volume per pump revolution can be adjusted and fixed using a correspondingly provided spindle. The stroke setting can be locked by mechanical fixing. If the stroke setting is performed using an adjusting spindle, the former can be locked using a lock nut. Advantageously, the inventive construction and use of exclusive fixed displacement pumps (for example external gear 25 pumps, internal gear pumps, screw spindle pumps) or adjustable fixed displacement pumps (for example axial piston pump, radial piston pump, vane pumps) for the first hydraulic machine 2 and the second hydraulic machine 3 is substantially easier to implement and more reliable in operation in comparison to variable-displacement pumps, the delivery volume of the latter being able to be permanently adjusted during operation. Considered on their own, variable-displacement pumps have the disadvantage that the adjustment system requires considerable additional complexity. In the case of variable-displacement pumps, the adjustment is implemented via so-called control pistons, which are subjected to a corresponding pressure or a hydraulic fluid, this requiring an additional proportional valve to regulate the pressure in the control piston. A position-measuring system is also provided to record the position. A control system is moreover required to supply the proportional valve. This represents significant additional complexity. In this regard, the present invention is simpler to implement in terms of its construction and also more reliable due to the smaller number of components to be supplied.

It is furthermore advantageous that the actuation of the hydraulic drive system is configured to be more efficient and simpler, since the delivery volume only needs to be set or adjusted once. The delivery volume of the second hydraulic machine 3 can be matched to the hydraulic cylinder-surface ratio by adjusting the eccentricity of the stroke ring. The volumetric flow conveyed in the hydraulic drive system 1 is controlled via the rotating speed of the first and second hydraulic machines 2, 3.

Preferably, at least one of the hydraulic machines 2, 3 is configured as an axial piston pump, radial piston pump or vane pump, and has a manual mechanical stroke setting of the delivery volume. The further hydraulic machine 2, 3 can be configured as a fixed displacement pump or as an adjustable fixed displacement pump.

Figure 2:
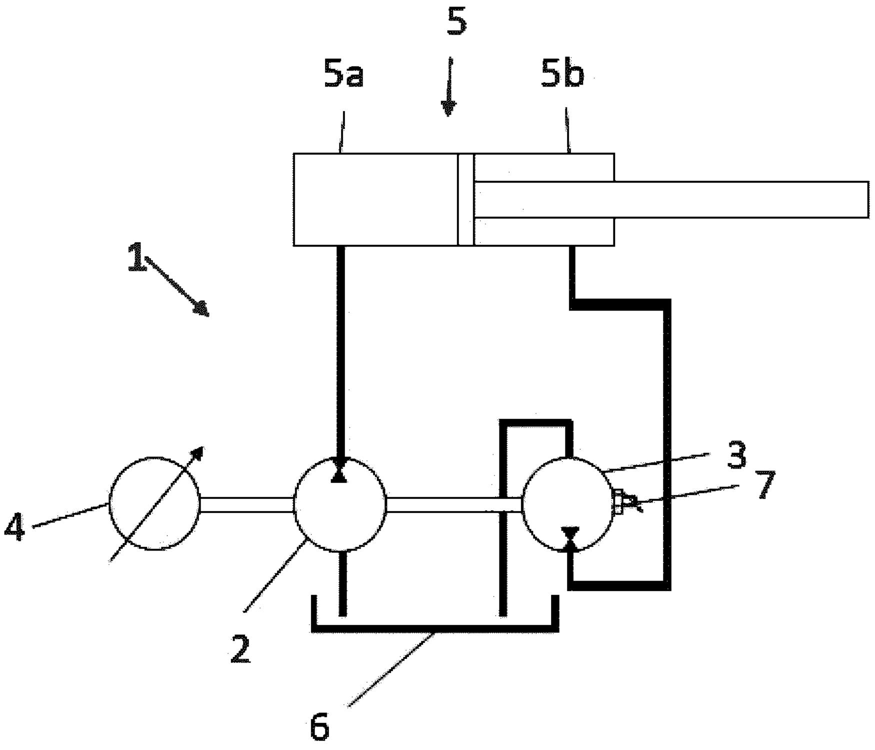
FIG. 2 shows a further embodiment of the hydraulic drive system according to the present invention.

In the embodiment illustrated in FIG. 1, the volume of the first hydraulic machine 2 can be smaller in comparison to that used in the first hydraulic machine 2 and illustrated in FIG. 2. In this way, the first hydraulic machine 2 in FIG. 1 can be configured correspondingly smaller, this being reflected in a more cost-effective use. The second hydraulic machine illustrated in FIG. 1 has two ports, both of which can be pressurized to full working pressure.

In FIG. 1 the second hydraulic machine 3 has the adjustment 7. The adjustment 7 is configured to adjust an adjustable delivery volume for the first hydraulic machine 2 and/or the second hydraulic machine 3. In particular, the delivery volume can be adjusted mechanically via the adjustment 7. In FIGS. 1 and 2, the second hydraulic machine 3 has the adjustment 7. This is only an exemplary and not a limiting representation. Optionally, the first hydraulic machine 2 can also have the adjustment 7. For example, in piston pumps and vane pumps, the adjustment 7 can be used to manually adjust the stroke of the pistons or vanes by adjusting the adjustment 7. This stroke setting leads to a change in the delivery volume per revolution. The adjustment 7 can be changed in terms of adjustment according to the determined first adjustment parameter, by driving in or driving out the screw. The adjustment 7 can be locked using a mechanical fixing device. This mechanical fixing device can be configured as a lock nut screwed onto the adjustment 7.

FIG. 2 shows a hydraulic drive system 1 according to a further embodiment. The hydraulic drive system 1 according to FIG. 2 comprises a first hydraulic machine 2 and a second hydraulic machine 3. The first hydraulic machine 2 and the second hydraulic machine 3 are driven conjointly, for example as illustrated via a shaft by a variable-speed drive 4. The first hydraulic machine 2 is hydraulically connected to a first hydraulic cylinder side 5*a* of a hydraulic cylinder 5. The second hydraulic machine 3 is hydraulically connected to a second hydraulic cylinder side 5*b* of a hydraulic cylinder 5. The first hydraulic machine 2 and the second hydraulic machine 3 are each connected to a reservoir 6. A feeder valve can be provided between the first hydraulic machine 2 and the reservoir 6 and between the second hydraulic machine 3 and the reservoir 6. In a further embodiment, the first hydraulic machine 2 and the second hydraulic machine 3 are connected conjointly to the reservoir 6 via a feeder valve.

If the variable-speed drive 4 drives the first hydraulic machine 2 and the second hydraulic machine 3, then, depending on the direction of rotation of the variable-speed drive 4, the first hydraulic machine 2 conveys hydraulic fluid from the reservoir 6 into the first hydraulic cylinder side 5*a* of the hydraulic cylinder 5, and the second hydraulic machine 3 conveys hydraulic fluid from the second hydraulic cylinder side 5*b* of the hydraulic cylinder into the reservoir 6. The piston is moved to a terminal position; for example, the piston of the hydraulic cylinder 5 is deployed. If the drive 4 drives the first hydraulic machine 2 and the second hydraulic machine 3 in the direction other than the previously described direction, the first hydraulic machine 2 conveys hydraulic fluid from the first hydraulic cylinder side 5*a* of the hydraulic cylinder 5 into the reservoir 6, and the second hydraulic machine 3 conveys hydraulic fluid from the second hydraulic cylinder side 5*b* of the hydraulic cylinder 5 into the reservoir 6. The piston of the hydraulic cylinder 5 is retracted. According to the invention, the delivery volume (volume) in the hydraulic drive system 1 is controlled by the adjustment parameter.

The connection of the first hydraulic machine 2 and the second hydraulic machine 3, as illustrated in FIGS. 1 and 2, when using a differential cylinder with an exemplary surface ratio of 2:1, leads to the first hydraulic machine 2 and the second hydraulic machine 3 having the same delivery volume, and in this way at least one hydraulic machine can be made smaller compared to the prior art mentioned at the beginning, which leads to a smaller space requirement and lower economic costs. The volumetric flow conveyed can be influenced by changing the rotating speed of the primary drive, and the displacement speed of the hydraulic cylinder 5 can be changed in this way.

Furthermore, it can be provided that the second hydraulic machine 3 is configured as a 4-quadrant stage. The 4-quadrant stage can be operated in a 4-quadrant operation with a positive torque and a positive direction of rotation, with a positive torque and a negative direction of rotation, with a negative torque and a positive direction of rotation, and with a negative torque and a negative direction of rotation.

In the embodiment illustrated in FIG. 2, the volume of the first hydraulic machine 2 is larger compared to that of the first hydraulic machine of FIG. 1. The second hydraulic machine 2 has two ports, only one of which is pressurized to the full working pressure.

In the construction shown in FIG. 2, the second port of the second hydraulic machine 3 is preferably always fluidically connected to the reservoir 6. The second hydraulic machine 3 can therefore only be configured to be provided with one pressure port. As a result thereof, the internal construction of the second hydraulic machine 3 is of a simpler configuration. The first hydraulic machine 2, on the other hand, now provides the entire volumetric flow requirement of the first cylinder chamber and is therefore larger compared to the embodiment of FIG. 1.

The reservoir 6 can be configured as a tank without positive pressure. The reservoir 6 can likewise be configured as a reservoir under positive pressure. Preferably, a positive pressure is provided in a range of 2-25 bar, particularly preferably in a range of 2-25 bar. This enables an improved induction of the first hydraulic machine 2 and second hydraulic machine 3 on the one hand, and on the other hand such a corresponding design embodiment enables the hydraulic medium to be separated from the atmosphere, thus counteracting the aging of the hydraulic medium.

Figure 3:
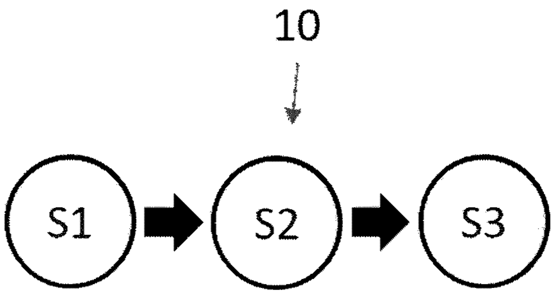
FIG. 3 shows a flowchart of an embodiment of a method according to the present invention.

FIG. 3 shows a flowchart of a method 10 for adjusting a delivery volume in a hydraulic drive system 1. The hydraulic drive system 1 has a first hydraulic machine 2 and a second hydraulic machine 3. The method illustrated in FIG. 3 can comprise the following method steps S1-S3. In a first step S1, a surface ratio between a first hydraulic cylinder surface 5*a* and a second hydraulic cylinder surface 5*b* of a hydraulic cylinder 5 of the hydraulic drive system 1 is determined. In a further step S2, a target delivery volume of the first hydraulic machine and/or the second hydraulic machine of the hydraulic drive system 1 is determined. In a further step S3, a first adjustment parameter of the first hydraulic machine 2 and/or the second hydraulic machine 3 is determined. Using the determined first adjustment parameter, the delivery volume of the first hydraulic machine 2 and/or the second hydraulic machine 3 of the hydraulic drive system 1 is adjusted. In a further embodiment it can be provided that further adjustment parameters are determined in order to adjust the delivery volume. In particular, it is provided that the delivery volume of the hydraulic drive system 1 is adjusted by adjusting the delivery volume of the first hydraulic machine 2 and of the second hydraulic machine 3.

Furthermore, it can be provided that the method comprises a further step. The further step comprises testing the first hydraulic machine 2 and/or the second hydraulic machine 3 on a test bench. Furthermore, testing of the first hydraulic machine 2 and/or of the second hydraulic machine 3 can be provided by a test run. It can be determined by the testing whether the adjusted delivery volume corresponds to the surface ratio of the hydraulic cylinder.

Furthermore, it can be provided that the delivery volume is adjusted by adjusting an adjusting element, preferably a threaded spindle, threaded bolt or a threaded screw, using the determined first adjustment parameter. Provision is preferably made to fix the adjusting element via a locking element, preferably a lock nut.

LIST OF REFERENCE SIGNS

1 Hydraulic drive system
2 First hydraulic machine
3 Second hydraulic machine
4 Variable-speed drive
5 Hydraulic cylinder
5*a* First hydraulic cylinder surface
5*b* Second hydraulic cylinder surface
6 Reservoir
7 Adjustment
S1-S3 Method steps

The invention claimed is:

1. A hydraulic drive system having a first hydraulic machine and a second hydraulic machine, which are mechanically connected to one another;
- wherein the first hydraulic machine and the second hydraulic machine are operated conjointly by a variable-speed drive;
- wherein the first hydraulic machine and the second hydraulic machine are hydraulically connected to at least a first hydraulic cylinder, comprising a first hydraulic cylinder side with a first hydraulic cylinder surface and a second hydraulic cylinder side with a second hydraulic cylinder surface;
- wherein the first hydraulic machine or the second hydraulic machine has an adjustable delivery volume, and wherein the first hydraulic machine and the second hydraulic machine are configured as fixed displacement pumps;
- wherein the first hydraulic machine is connected to a reservoir of the hydraulic drive system, and the reservoir is configured as a pre-stressed reservoir;
- wherein the second hydraulic machine is hydraulically connected to the first hydraulic cylinder surface and to the second hydraulic cylinder surface; and
- wherein, when the second hydraulic machine conveys a hydraulic fluid with a volume flow from the second hydraulic cylinder side to the first hydraulic cylinder side, then the second hydraulic machine conveys a full volume flow from the second hydraulic cylinder side to the first hydraulic cylinder side.

2. The hydraulic drive system as claimed in claim 1, wherein a ratio of the delivery volumes of the first hydraulic machine and the second hydraulic machine is mechanically adjustable to a surface ratio of the first hydraulic cylinder surface and the second hydraulic cylinder surface.

3. The hydraulic drive system as claimed in claim 1, wherein a delivery volume of the hydraulic drive system is controlled by a determined adjustment parameter.

4. The hydraulic drive system as claimed in claim 1, wherein the first hydraulic cylinder surface and the second hydraulic cylinder surface are different.

5. The hydraulic drive system as claimed in claim 1, wherein the first hydraulic machine and/or the second hydraulic machine are/is selected from a group of pumps comprising at least a positive displacement pump, in particular an axial piston pump, radial piston pump or vane pump, gear pump, or spindle pump.

6. The hydraulic drive system as claimed in claim 1, wherein the first hydraulic machine is connected to the first hydraulic cylinder surface of the hydraulic cylinder.

7. The hydraulic drive system as claimed in claim 1, wherein the pre-stressed reservoir has a pressure in a fluctuation range preferably of 22 bar, more preferably of 14 bar.

8. The hydraulic drive system as claimed in claim 1, wherein the first hydraulic machine and/or the second hydraulic machine have/has at least one high-pressure port.

9. The hydraulic drive system as claimed in claim 1, configured to control the hydraulic cylinder with a constant total pressure in the hydraulic drive system.

10. The hydraulic drive system as claimed in claim 1, wherein, depending on a direction of rotation, hydraulic fluid is transferred between the first and second hydraulic cylinder surfaces through the second hydraulic machine.

11. The hydraulic drive system as claimed in claim 1, wherein the second hydraulic machine is configured as a 4-quadrant stage.

12. The hydraulic system as claimed in claim 1, wherein the second hydraulic machine has a first pressure port and a second pressure port, each rated for full working pressure, the first pressure port being directly hydraulically connected to the first hydraulic cylinder side and the second pressure port being directly hydraulically connected to the second hydraulic cylinder side.

* * * * *